United States Patent
Kim et al.

(10) Patent No.: US 11,648,710 B2
(45) Date of Patent: May 16, 2023

(54) METHOD OF MANUFACTURING PLASTIC SUBSTRATE AND PLASTIC SUBSTRATE MANUFACTURED THEREBY

(71) Applicant: LG CHEM, LTD., Seoul (KR)

(72) Inventors: Yong Suk Kim, Daejeon (KR); Hye Min Kim, Daejeon (KR); Boo Kyung Kim, Daejeon (KR); Yeong Rae Chang, Daejeon (KR); Young Tae Kim, Daejeon (KR); Ji Young Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 225 days.

(21) Appl. No.: 16/757,914

(22) PCT Filed: Nov. 2, 2018

(86) PCT No.: PCT/KR2018/013263
§ 371 (c)(1),
(2) Date: Apr. 21, 2020

(87) PCT Pub. No.: WO2019/088764
PCT Pub. Date: May 9, 2019

(65) Prior Publication Data
US 2020/0338792 A1    Oct. 29, 2020

(30) Foreign Application Priority Data
Nov. 3, 2017    (KR) .................. 10-2017-0145903

(51) Int. Cl.
| | | |
|---|---|---|
| *B29C 43/02* | (2006.01) | |
| *G02B 1/04* | (2006.01) | |
| *B29L 11/00* | (2006.01) | |

(52) U.S. Cl.
CPC .............. *B29C 43/02* (2013.01); *G02B 1/045* (2013.01); *B29L 2011/0016* (2013.01)

(58) Field of Classification Search
CPC .. B29C 43/02; G02B 1/045; B29L 2011/0016
See application file for complete search history.

(56) References Cited

U.S. PATENT DOCUMENTS

| | | | |
|---|---|---|---|
| 6,136,235 A | 10/2000 | Saito et al. | |
| 2010/0155987 A1* | 6/2010 | Kim | B29C 39/42<br>249/134 |
| 2010/0259821 A1* | 10/2010 | Kaida | C08F 2/44<br>359/485.05 |
| 2016/0297107 A1 | 10/2016 | Shim et al. | |

FOREIGN PATENT DOCUMENTS

| | | |
|---|---|---|
| CN | 101784383 A | 7/2010 |
| CN | 105682907 A | 6/2016 |
| JP | 07-186228 A | 7/1995 |
| JP | 2002-264147 A | 9/2002 |
| JP | 2006-224193 A | 8/2006 |
| JP | 3898394 B2 | 1/2007 |
| JP | 2009-069553 A | 4/2009 |

(Continued)

*Primary Examiner* — Larry W Thrower
(74) *Attorney, Agent, or Firm* — Dentons US LLP

(57) ABSTRACT

A method for manufacturing a plastic substrate having excellent thickness uniformity, and a plastic substrate having excellent thickness uniformity manufactured thereby.

7 Claims, 1 Drawing Sheet

(56) References Cited

FOREIGN PATENT DOCUMENTS

| | | |
|---|---|---|
| JP | 2011-255627 A | 12/2011 |
| JP | 2016-010950 A | 1/2016 |
| JP | 2016-107524 A | 6/2016 |
| KR | 1020010030879 A | 4/2001 |
| KR | 10-2001-0099913 A | 8/2006 |
| KR | 10-2015-0022665 A | 3/2015 |
| KR | 10-2015-0060562 A | 6/2015 |
| KR | 10-2017-0003181 A | 1/2017 |
| KR | 10-2017-0018216 A | 2/2017 |
| KR | 10-2017-0105989 A | 9/2017 |
| KR | 10-2017-0118200 A | 10/2017 |

* cited by examiner

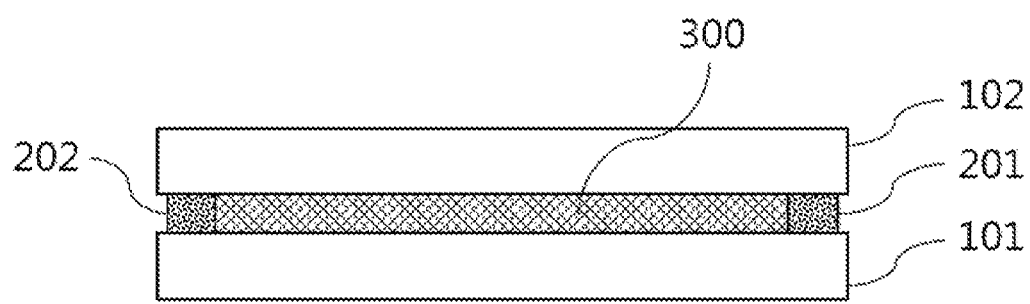

METHOD OF MANUFACTURING PLASTIC SUBSTRATE AND PLASTIC SUBSTRATE MANUFACTURED THEREBY

CROSS-REFERENCE TO RELATED APPLICATIONS

This application is a U.S. national stage of international Application No. PCT/KR2018/013263 filed on Nov. 2, 2018, and claims priority to and the benefit of Korean Patent Application No. 10-2017-0145903 filed on Nov. 3, 2017, the entire contents of which are incorporated by reference as if fully set forth herein.

TECHNICAL FIELD

The present invention relates to a method of manufacturing a plastic substrate and a plastic substrate manufactured thereby.

BACKGROUND

Recently, an apparatus for providing a three-dimensional image to a user has been developed using a virtual reality device and an augmented reality device.

The virtual reality device or the augmented reality device forms a diffraction light guide pattern in a lens such as general eyeglasses to display a desired image to a user. In general, a lens used for the virtual reality device or the augmented reality device uses a glass substrate having a high refractive index and the glass substrate has an advantage of having the high refractive index and high light transmittance, but can give serious damage an eye of the user at the time of breakage and the glass substrate is heavy and is inconvenient to wear for a long time.

Accordingly, it is necessary to study a lens substrate which has the high light transmittance and the high refractive index and furthermore, is light and is relatively safe at the time of breakage so as to be used for a usage of the virtual reality device or augmented reality device.

In the case of a plastic substrate for replacing the glass substrate, there is a problem that physical properties such as surface flatness and thickness uniformity are much worse than those of the glass substrate in the related art, and as a result, a study for improvement of the problem is required.

RELATED PATENT DOCUMENT

Korean Patent Unexamined Publication No. KR 10-2015-0060562 A

SUMMARY

The present invention provides a method for manufacturing a plastic substrate. Specifically, the present invention provides a method for manufacturing a plastic substrate with excellent thickness uniformity.

However, the object to be solved by the present invention is not limited to the aforementioned object and other objects, which are not mentioned above, will be apparent to a person having ordinary skill in the art from the following description.

An embodiment of the present invention provides a method for manufacturing a plastic substrate, which includes: preparing a molding equipment including a flat plate type lower substrate, a flat plate type upper substrate, and a buffered spacer between the flat plate type lower substrate and the flat plate type upper substrate and partitioning a molding space by the buffered spacer; buffering a curable composition in the molding space; compressing the curable composition with a load of the flat plate type upper substrate and curing the curable composition; and obtaining the plastic substrate by removing the flat plate type upper substrate and the flat plate type lower substrate, in which the curing of the curable composition satisfies Formula 1 below.

$$\{(\text{load of flat plate type upper substrate} + \text{curing shrinkage force of curable composition}) \times 0.95\} \leq \text{compressive stress of buffered spacer} \leq \{(\text{load of flat plate type upper substrate} + \text{curing shrinkage force of curable composition}) \times 1.05\} \quad [\text{Formula 1}]$$

An embodiment of the present invention provides a plastic substrate manufactured by the method for manufacturing a plastic substrate.

According to a method for manufacturing a plastic substrate according to an embodiment of the present invention, a plastic substrate having excellent surface flatness and thickness uniformity can be manufactured.

According to a method for manufacturing a plastic substrate according to an embodiment of the present invention, a plastic substrate having excellent thickness uniformity and surface flatness can be manufactured by a simple method.

BRIEF DESCRIPTION OF DRAWING

The FIGURE is a cross-section view during a step of curing a curable composition according to an exemplary embodiment.

DETAILED DESCRIPTION

Throughout the specification, a case where a part "comprises" an element will be understood to imply the inclusion of stated elements but not the exclusion of any other elements unless explicitly described to the contrary.

In the specification, it will be understood that when a member is referred to as being "on" another member, it can be directly on the other member or intervening members may also be present.

In the specification, the term of a degree used "step (of~)" or "step of~" does not mean "step for".

The present inventors have developed the present invention by recognizing there is a problem that when a curable composition is injected into a mold and then cured to manufacture a plastic substrate, the curable composition is peeled off from a mold substrate during curing due to curing shrinkage of the curable composition and a peeling mark is thus left on the surface of the manufactured plastic substrate and thickness uniformity is greatly damaged.

Hereinafter, the specification will be described in more detail.

An embodiment of the present invention provides a method for manufacturing a plastic substrate, which includes: preparing a molding equipment including a flat plate type lower substrate, a flat plate type upper substrate, and a buffered spacer between the flat plate type lower substrate and the flat plate type upper substrate and partitioning a molding space by the buffered spacer; buffering a curable composition in the molding space; compressing the curable composition with a load of the flat plate type upper substrate and curing the curable composition; and obtaining the plastic substrate by removing the flat plate type upper substrate and the flat plate type lower substrate, in which the curing of the curable composition satisfies Formula 1 below.

$$\{(\text{load of flat plate type upper substrate} + \text{curing shrinkage force of curable composition}) \times 0.95\} \leq \text{compressive stress of buffered spacer} \leq \{(\text{load of flat plate type upper substrate} + \text{curing shrinkage force of curable composition}) \times 1.05\} \quad \text{[Formula 1]}$$

The method for manufacturing a plastic substrate according to an embodiment of the present invention minimizes a phenomenon in which a curable composition is peeled off from a substrate of a mold equipment due to shrinkage while curing the curable composition by using a buffered spacer to manufacture a plastic substrate having excellent surface flatness and thickness uniformity.

According to an embodiment of the present invention, the compressive stress of the buffered spacer satisfies Formula 1 above. Since the compressive stress of the buffered spacer has a difference of within 5% of a sum of the load of the flat plate type upper substrate and the curing shrinkage force of the curable composition, the flat plate type upper substrate is brought into close contact with the curable composition by shrinkage when the curable composition is cured in the step of curing the curable composition. Accordingly, the manufactured plastic substrate exhibits excellent surface flatness, and further, the thickness uniformity may be implemented to be excellent.

On the other hand, when the compressive stress of the buffered spacer is smaller than $\{(\text{load of flat plate type upper substrate} + \text{curing shrinkage force of curable composition}) \times 0.95\}$, the curing is completed before the equilibrium is reached, and as a result, non-uniformity of the thickness of the plastic substrate may occur. In addition, when the compressive stress of the buffered spacer is larger than $\{(\text{load of flat plate type upper substrate} + \text{curing shrinkage force of curable composition}) \times 1.05\}$, the shrinkage is uneven during curing, and as a result, an appearance characteristic of the plastic substrate may be poor.

Specifically, according to an embodiment of the present invention, Formula 1 above may satisfy Formula 1-1, Formula 1-2, or Formula 1-3 below.

$$\{(\text{load of flat plate type upper substrate} + \text{curing shrinkage force of curable composition}) \times 0.97\} \leq \text{compressive stress of buffered spacer} \leq \{(\text{load of flat plate type upper substrate} + \text{curing shrinkage force of curable composition}) \times 1.03\} \quad \text{[Formula 1-1]}$$

$$\{(\text{load of flat plate type upper substrate} + \text{curing shrinkage force of curable composition}) \times 0.98\} \leq \text{compressive stress of buffered spacer} \leq \{(\text{load of flat plate type upper substrate} + \text{curing shrinkage force of curable composition}) \times 1.02\} \quad \text{[Formula 1-2]}$$

$$\{(\text{load of flat plate type upper substrate} + \text{curing shrinkage force of curable composition}) \times 0.99\} \leq \text{compressive stress of buffered spacer} \leq \{(\text{load of flat plate type upper substrate} + \text{curing shrinkage force of curable composition}) \times 1.01\} \quad \text{[Formula 1-3]}$$

Specifically, the compressive stress of the buffered spacer may be within 3%, within 2%, or within 1% of the sum of the load of the flat plate type upper substrate and the curing shrinkage force of the curable composition, and as a result, the manufactured plastic substrate may exhibit better surface flatness and the thickness uniformity may also be improved.

In the present invention, units of the load of the flat plate upper plate, the curing shrinkage force, and the compressive stress may be kgf or N.

The buffered spacer prevents the curable composition from peeling off from the flat plate type upper substrate in accordance with shrinkage of the curable composition due to curing. Specifically, the buffered spacer has a compressive stress based on a degree of shrinkage of the curable composition during curing of the curable composition and the load of the flat plate type upper substrate. Accordingly, the buffered space is compressed by the load of the flat plate type upper substrate by the shrinkage of the curable composition to maintain a state in which the curable composition and the flat plate type upper substrate are in close contact with each other while the curable composition is cured.

According to an embodiment of the present invention, the load of the flat plate type upper substrate may be 3.4 N to 34 N. Specifically, the load of the flat plate type upper substrate may be 5.9 N to 27 N.

When the load of the flat plate type upper substrate is within the above range, deformation due to curing shrinkage upon curing of the curable composition may be minimized. Further, when the load of the flat plate type upper substrate is within the above range, deterioration of transmittance of the curable composition during photo-curing may be minimized, and emission unevenness of reaction heat during thermal curing of the curable composition is minimized, which may induce uniform curing of the curable composition.

In the specification, the curing shrinkage force of the curable composition may be measured by the following method. Specifically, a predetermined amount of curable composition is applied onto a lower jig by using TA's Texture Analyzer equipment in an atmosphere of 25° C. and 50 RH % and then, an upper jig is lowered and contacted with the curable composition to record an initial value of the force. Then, the temperature is raised to 90° C. and held for 5 hours, and a final value of the force is measured as a value obtained by the difference between the final value of the force and the initial value.

In the specification, the compressive stress of the buffered spacer may be a measured value of force at a moment of reaching deformation (initial thickness thickness after deformation)/initial thickness) of a specimen at the time of compression with a specimen area of 5×5 mm² and at a compression speed of 1 mm/min by using the TA's Texture Analyzer under an atmosphere of 25° C. and 50 RH %.

According to an embodiment of the present invention, the molding space may mean an empty space partitioned by the buffered spacer and provided between the flat plate type lower substrate and the flat plate type upper substrate.

According to an embodiment of the present invention, the step of buffering the curable composition may mean injecting the curable composition into the molding space to sufficiently fill the curable composition so that the curable composition closely contacts the flat plate type lower substrate and the flat plate type upper substrate. Specifically, the step of buffering the curable composition may mean that the curable composition is injected into the molding space at 95 vol % or more, 97 vol % or more, 99 vol % or more, preferably 100 vol %.

According to an embodiment of the present invention, the step of buffering the curable composition may use various methods such as a method for injecting the curable composition in the molding space of the flat plate type lower substrate with the buffered spacer and stacking the flat plate type upper substrate or a method for injecting the curable composition by providing an injection port in the mold equipment.

The FIGURE is a cross-section view of the curing of the curable composition. Specifically, as illustrated in the FIGURE, a curable composition 300 is injected and buffered into a molding space of a molding equipment including buffered spacers 201 and 202 provided between a flat plate type lower substrate 101 and a flat plate type upper substrate 102. As such, the curable composition is buffered and then, is subjected to photocuring and/or thermal curing to manufacture the plastic substrate.

According to an embodiment of the present invention, in order to perform the thermal curing, a temperature rising speed of the curable composition upon heat treatment may be 2° C./min or less. Specifically, the temperature rising speed may be 1° C./min or less. When the temperature rising speed is within the above range, an inter-position deviation of heat transmitted to the curable composition is minimized and uneven emission of the reaction heat is minimized to induce uniform curing of the curable composition.

According to an embodiment of the present invention, a final temperature during the thermal curing may be 85° C. to 100° C. and an isothermal holding period may be maintained at a temperature lower than the final temperature three or more times before reaching the final temperature to minimize the inter-position deviation of the heat transmitted to the curable composition. A temperature difference between the isothermal holding periods may be 10° C. to 20° C. and a holding time of each isothermal holding period may be 1 hour to 5 hours. For example, the curable composition is left at room temperature (25° C.) for 2 hours and then thermally cured at 45° C. for 2 hours, at 60° C. for 2 hours, at 75° C. for 2 hours, and at 90° C. for 4 hours to manufacture the plastic substrate.

According to an embodiment of the present invention, a flexural modulus of each of the flat plate type lower substrate and the flat plate type upper substrate may be 3 GPa or more. Specifically, the flexural modulus of each of the flat plate type lower substrate and the flat plate type upper substrate may be 10 GPa or more, 20 GPa or more, or 40 GPa or more.

When the flexural modulus of each of the flat plate type lower substrate and the flat plate type upper substrate is within the above range, a bowing phenomenon of the flat plate type upper substrate may be minimized, so that the thickness uniformity of the manufactured plastic substrate may be greatly increased.

According to an embodiment of the present invention, the surface flatness of each of the flat plate type lower substrate and the flat plate type upper substrate may be 5 μm or less. Specifically, the surface flatness of each of the flat plate type lower substrate and the flat plate type upper substrate may be 2 μm or less or 1 μm or less.

When the surface flatness of each of the flat plate type lower substrate and the flat plate type upper substrate is within the above range, the surface flatness of the manufactured plastic substrate may also be greatly enhanced as compared with the general plastic substrate.

In the specification, the surface flatness may be obtained by measuring one point per 0.16×0.16 mm$^2$ in an area of 200 mm in diameter with an aspheric stitching interferometry (ASI) equipment of a QED company under an atmosphere of 25° C. and 50 RH % or may mean a difference between highest and lowest values of a height measured at an interval of a radius of 5 mm and 11.25° with respect to any origin in the area of 200 mm in diameter by using a Duckin's 3D shape measuring instrument.

According to an embodiment of the present invention, a compressive elastic modulus of the buffered spacer may be 0.1 MPa to 10 MPa. Specifically, the compressive elastic modulus of the buffered spacer may be 0.1 MPa to 5 MPa, 0.1 MPa to 3 MPa, or 0.1 MPa to 2 MPa.

When the compressive elastic modulus of the buffered spacer is within the above range, the thickness uniformity of the plastic substrate may be increased by transmitting a load to the curable composition uniformly when the flat plate type upper substrate is contacted.

In the present invention, the compressive elastic coefficient of the buffered spacer may mean a slope of force measured at the time of compressing a specimen of a specimen area of 5×5 mm$^2$ at a compression speed of 1 mm/min by using the TA's Texture Analyzer for specimen deformation ((initial thickness−thickness after deformation)/initial thickness) under an atmosphere of 25° C. and 50 RH %. Further, the compressive elastic modulus of the buffered spacer in the case where the buffered spacer is constituted by two or more different layers may mean a slope of force measured at the time of compressing a specimen at a compression speed of 1 mm/min by preparing stacked specimens with an area of 5×5 mm$^2$ for the specimen deformation ((initial thickness−thickness after deformation)/initial thickness).

According to an embodiment of the present invention, the buffered spacer may be a structure in which a non-elastic layer and an elastic layer are stacked, a structure in which the elastic layer is provided between the non-elastic layers, or a structure in which the non-elastic layer is provided between the elastic layers. On the other hand, when the buffered spacer is the structure in which the non-elastic layer and the elastic layer are stacked, the structure in which the elastic layer is provided between the non-elastic layers, or the structure in which the non-elastic layer is provided between the elastic layers, the compressive elastic modulus of the buffered spacer may mean the compressive elastic modulus of the elastic layer.

Since the buffered spacer may be designed in consideration of the degree of shrinkage of the curable composition, the non-elastic layer may serve to support the curable composition and the elastic layer may serve to adjust a height change due to the shrinkage of the curable composition.

According to an embodiment of the present invention, a curing shrinkage rate of the curable composition may be 15% or less. Specifically, the curing shrinkage rate of the curable composition may be 1% to 15%, 1% to 12%, or 1% to 10%.

The curing shrinkage rate of the curable composition may be derived as shown in General Formula 1 below.

$$\text{Curing shrinkage rate (\%)} = \{(\text{volume before curing} - \text{volume after full curing})/\text{volume before curing}\} \times 100 \quad \text{[General Formula 1]}$$

According to an embodiment of the present invention, the thickness of the plastic substrate may be 400 μm to 2000 μm and a thickness deviation of the plastic substrate may be within 1%.

Specifically, the lower the thickness deviation value of the plastic substrate, the higher the uniformity of the thickness of the plastic substrate. That is, the plastic substrate manufactured according to an embodiment of the present invention may have very good thickness uniformity with a thickness deviation within 1%.

The thickness of the plastic substrate may be adjusted according to the distance between the flat plate type lower substrate and the flat plate type upper substrate and the curing shrinkage rate of the curable composition. Furthermore, the thickness of the plastic substrate may be adjusted within the above range depending on the usage of the plastic substrate.

Further, the thickness deviation of the plastic substrate may be derived as shown in General Formula 2 below.

Thickness deviation (%)=(maximum deviation/average thickness)×100 [General Formula 1]

In the specification, in regard to the thickness of a member, a maximum thickness or a minimum thickness may be measured using a contact type measuring method using a Digimatic Thick 547-401 equipment of Mitsutoyo under an atmosphere of 25° C. and 50 RH %. Further, in the specification, in regard to the thickness of a member, the maximum thickness or the minimum thickness may be measured using a non-contact type measuring method using an IFS-2405-1 or IFC-2451-MP equipment of Micro-Epsilon under the atmosphere of 25° C. and 50 RH %.

In the specification, the average thickness of the member may be an average value of thicknesses measured at an interval of a radius of 10 mm and 22.5° with an arbitrary point of a specimen which is arbitrarily arranged as the origin by using the contact type measuring method using the Digimatic Thick 547-401 equipment of Mitsutoyo under the atmosphere of 25° C. and 50 RH %. Further, in the specification, the average thickness of the member may be an average value of thicknesses measured at an interval of mm with respect to each of horizontal and vertical directions with an arbitrary point of a specimen which is arbitrarily arranged as the origin by using the non-contact type measuring method using an Optical Wear Thickness Measurement System (OWTM) equipment of FiberPro under the atmosphere of 25° C. and 50 RH %.

According to an embodiment of the present invention, the curable composition may be a photo-curable composition or a thermal curable composition. Specifically, the curable composition may be the thermal curable composition.

According to an embodiment of the present invention, each of the flat plate type lower substrate and the flat plate type upper substrate may be a transparent substrate. Specifically, each of the flat plate type lower substrate and the flat plate type upper substrate may be an organic substrate, which may effectively perform photo-curing of the curable composition by excellent transparency.

An embodiment of the present invention includes a step of obtaining the plastic substrate by removing the flat plate type upper substrate and the flat plate type lower substrate. Removing the flat plate type upper substrate and the flat plate type lower substrate may mean separating the flat plate type upper substrate and the flat plate type lower substrate from the plastic substrate, which is a cured product of the curable composition, after the curing of the curable composition is completed.

According to an embodiment of the present invention, the surface of each of the flat plate type lower substrate and the flat plate type upper substrate may be surface-treated with a release agent. The release agent may be applied without limitation as long as the release agent is generally used in the art. As an example, the surface-treating with the above release agent may be surface-coating with a fluorine-based silane coupling agent.

When the surface is coated using the release agent, damage to the surface of the plastic substrate may be minimized during the step of obtaining the plastic substrate and the flat plate type lower substrate and the flat plate type upper substrate may be removed.

According to an embodiment of the present invention, the curable composition may be applied without limitation as long as the curable composition is for manufacturing the plastic substrate. Specifically, the curable composition may be applied without limitation as long as the curable composition may manufacture the plastic substrate using mold casting.

An embodiment of the present invention provides a plastic substrate manufactured by the method for manufacturing a plastic substrate.

According to an embodiment of the present invention, the plastic substrate may satisfy the following physical properties.

According to an embodiment of the present invention, the plastic substrate may have an optical refractive index of 1.65 or more at a wavelength of 532 nm.

A general glass substrate has the optical refractive index of 1.65 or more at the wavelength of 532 nm. Although the plastic substrate according to an embodiment of the present invention is made of plastic, the plastic substrate may have an optical refractive index comparable to the glass substrate, and as a result, the glass substrate may be replaced with the plastic substrate.

According to an embodiment of the present invention, the plastic substrate may have a glass transition temperature of 40° C. or higher.

In the case of a wearable device, an image may be continuously transmitted and output, and as a result, a temperature of a lens substrate may rise. The plastic substrate according to an embodiment of the present invention may be implemented at the glass transition temperature of 40° C. or higher, so that a change in physical properties according to the temperature may be minimized even when the plastic substrate is used as the lens substrate of the wearable device.

According to an embodiment of the present invention, the plastic substrate may be for a diffraction light guide lens substrate of the wearable device.

An embodiment of the present specification provides a wearable device including the plastic substrate. Specifically, the wearable device may be an augmented reality device or a virtual reality device. The plastic substrate may be included as the lens substrate of the wearable device, and the plastic substrate may be adopted as a substrate which includes a diffraction light guide pattern portion on one surface to input, move, and transmit input optical information.

Since the plastic substrate according to one embodiment of the present invention has a high optical refractive index, when the plastic substrate is used as the lens substrate of the wearable device, optical loss may be minimized and movement of the optical information may be achieved. Furthermore, it is possible to achieve high durability by minimizing the change in physical properties due to heat generated by operating the wearable device because the plastic substrate has a high glass transition temperature.

EXAMPLES

Hereinafter, the present invention will be described in detail with reference to Examples for a specific description. However, the Examples according to the present invention may be modified in various forms, and it is not interpreted that the scope of the present invention is limited to the Examples described below. The Examples of the present invention will be provided for more completely explaining the present invention to those skilled in the art.

PREPARATION EXAMPLE

Preparation of Curable Composition

A curable composition was prepared, which includes 88.5 parts by weight of bis(2,3-epithiopropyl)disulfide, 6.5 parts by weight of 2,2'-thiodiethanethiol, 5.0 parts by weight of isophorone diisocyanate, and 0.07 parts by weight of tetrabutylphosphonium bromide.

The curing shrinkage force of the curable composition prepared was measured by the aforementioned method of measuring the curing shrinkage force and found to be $2.00 \times 10^{-4}$ N/mm$^2$.

Example 1

A glass substrate having a flexural modulus of 70 GPa, surface flatness of 0.5 μm, a thickness of 30 mm, and a diameter of 200 mm was used as a lower substrate, and a silicon made buffered spacer having a compressive elastic modulus of 1.0 MPa, a height of 427 μm, and a cross-sectional area of 10×10 mm$^2$ was provided at an interval of 120° so as to contact a circumference of the lower substrate to form a molding space, the curable composition prepared according to the preparation example was injected into the molding space, and thereafter, the curable composition was buffered in the molding space by using a glass substrate having a flexural modulus of 70 GPa, a load of 8.2 N, a diameter of 200 mm and surface flatness of 0.5 μm as an upper substrate.

Further, the curable composition is put in a convection oven of J. Otec Co., and left at room temperature for 2 hours and then thermally cured at 45° C. for 2 hours, at 60° C. for 2 hours, at 75° C. for 2 hours, and at 90° C. for 4 hours after setting a temperature rising speed to 1° C./min to manufacture the plastic substrate.

Example 2

The plastic substrate was prepared in the same method as in Example 1 except that the height of the spacer was adjusted to 1,007 μm.

Example 3

The plastic substrate was manufactured by using the same method as in Example 1 except that a structure of the spacer is changed to a structure of an elastic layer (171 μm)/non-elastic layer (829 μm) using an ultraviolet crosslinked polyolefin-based elastic layer having a compressive elastic modulus of 0.16 MPa and a glass made non-elastic layer having a compressive elastic modulus of 70 GPa.

Example 4

The plastic substrate was manufactured prepared by using the same method as in Example 1 except that the structure of the spacer is changed to a structure of a non-elastic layer (198 μm)/an elastic layer (164 μm)/a non-elastic layer (198 μm) using an ultraviolet crosslinked polyolefin-based elastic layer having the compressive elastic modulus of 0.16 MPa and the glass made non-elastic layer having the compressive elastic modulus of 70 GPa.

Example 5

The plastic substrate was manufactured by using the same method as in Example 1 except that the structure of the spacer is changed to a structure of an elastic layer (430 μm)/non-elastic layer (500 μm) using a silicon made elastic layer having a compressive elastic modulus of 1.0 MPa and the glass made non-elastic layer having the compressive elastic modulus of 70 MPa.

Comparative Example 1

The plastic substrate was manufactured by using the same method as Example 1 except that a polycarbonate based spacer having a compressive elastic modulus of 2 GPa and a height of 502 μm was used.

Comparative Example 2

The plastic substrate was prepared by using the same method as in Example 1 except that the structure of the spacer is changed to the structure of the elastic layer (160 μm)/non-elastic layer (829 μm) using the ultraviolet crosslinked polyolefin-based elastic layer having the compressive elastic modulus of 0.16 MPa and the glass made non-elastic layer having the compressive elastic modulus of 70 GPa.

Comparative Example 3

The plastic substrate was manufactured in the same method as in Example 2, except that the thermal curing condition was set to a temperature rising speed of 3° C./min and changed to a temperature of 60° C. for 2 hours and 90° C. for 4 hours.

Specific details according to Examples 1 to 5 and Comparative Examples 1 to 3 and physical properties of the plastic substrate thus manufactured are shown in Table 1 below.

TABLE 1

| | Compressive elastic modulus of spacer (MPa) | | Height of spacer (μm) | | Compressive stress of spacer (N) | Shrinkage force of curable composition (N) | Load of upper substrate (N) | Diameter of plastic substrate (mm) | Thickness of plastic substrate (μm) | Thickness deviation (%) | Appearance |
|---|---|---|---|---|---|---|---|---|---|---|---|
| | Elastic layer | Non-elastic layer | Elastic layer | Non-elastic layer | | | | | | | |
| Example 1 | 1.0 | — | 427 | — | 9.84 | 1.46 | 8.2 | 150 | 413 | 0.4 | Good |
| Example 2 | 1.0 | — | 1,007 | — | 11.62 | 3.40 | 8.2 | 150 | 968 | 0.4 | Good |
| Example 3 | 0.16 | 70,000 | 171 | 829 | 11.51 | 3.40 | 8.2 | 150 | 959 | 0.2 | Good |
| Example 4 | 0.16 | 70,000/70,000 | 164 | 198/198 | 9.95 | 1.86 | 8.2 | 150 | 526 | 0.3 | Good |
| Example 5 | 1.0 | 70,000 | 430 | 500 | 11.86 | 3.24 | 8.2 | 150 | 913 | 0.2 | Good |
| Comparative Example 1 | 2,000 | — | 502 | — | 4,780.88 | 1.76 | 8.2 | 150 | 478 | 8.4 | Bad |

TABLE 1-continued

| | Compressive elastic modulus of spacer (MPa) | | Height of spacer (μm) | | Compressive stress of spacer (N) | Shrinkage force of curable composition (N) | Load of upper substrate (N) | Diameter of plastic substrate (mm) | Thickness of plastic substrate (μm) | Thickness deviation (%) | Appearance |
|---|---|---|---|---|---|---|---|---|---|---|---|
| | Elastic layer | Non-elastic layer | Elastic layer | Non-elastic layer | | | | | | | |
| Comparative Example 2 | 0.16 | 70,000 | 160 | 829 | 20.10 | 3.18 | 8.2 | 150 | 922 | 4.5 | Bad |
| Comparative Example 3 | 1.0 | — | 1,007 | — | 8.04 | 3.42 | 8.2 | 150 | 980 | 4.1 | Good |

The evaluation of the appearance of the plastic substrate of Table 1 was judged by whether there was a spalling phenomenon of the plastic substrate with the naked eye. The evaluation of the appearance was evaluated as good when the spalling phenomenon was not found by the naked eye and as bad when the spalling phenomenon was found by the naked eye.

Further, the compressive elastic modulus of the spacer, the compressive stress of the spacer, the shrinkage of the curable composition, and the thickness deviation in Table 1 were measured as described above.

According to Table 1 above, it can be seen that the plastic substrate manufactured according to working Examples 1 to 5 exhibits a very low thickness deviation, and thus has high thickness uniformity. On the other hand, in the case of Comparative Examples 1 and 2, an adhesive force with the upper substrate could not be maintained during shrinkage due to curing of the curable composition and a very bad thickness deviation was exhibited because the compressive stress of the spacer was too high. As a result, it can be seen that low thickness uniformity was obtained similar to the working Examples 1 to 5. Furthermore, it can be seen that the plastic substrate manufactured according to Comparative Examples 1 and 2 was separated from the upper substrate during curing and the spalling phenomenon was thus shown on the surface. As a result, an appearance characteristic is also bad. Further, in the case of Comparative Example 3, it can be seen that the compressive stress of the spacer was low, indicating that the thickness deviation was very poor.

Accordingly, it can be seen that the method of manufacturing a plastic substrate according to the present invention may implement a plastic substrate having excellent thickness uniformity and excellent appearance characteristics.

EXPLANATION OF REFERENCE NUMERALS AND SYMBOLS

101: Flat plate type lower substrate
102: Flat plate type upper substrate
201, 202: Buffered spacer
300: Curable composition

The invention claimed is:

1. A method for manufacturing a plastic substrate, the method comprising:
    preparing a molding equipment including a flat plate lower substrate, a flat plate upper substrate, and a buffered spacer between the flat plate lower substrate and the flat plate upper substrate, wherein a molding space is partitioned by the buffered spacer;
    buffering a curable composition in the molding space;
    compressing the curable composition with a load of the flat plate upper substrate and curing the curable composition; and
    removing the flat plate upper substrate and the flat plate lower substrate to obtain the plastic substrate,
    wherein the curing of the curable composition satisfies Formula 1 below:

{(load of flat plate upper substrate+curing shrinkage force of curable composition)×0.95}≤compressive stress of buffered spacer≤{(load of flat plate upper substrate+curing shrinkage force of curable composition)×1.05}, [Formula 1] and wherein a surface flatness of each of the flat plate lower substrate and the flat plate upper substrate is 5 μm or less.

2. The method of claim 1, wherein a flexural modulus of each of the flat plate lower substrate and the flat plate upper substrate is 3 GPa or more.

3. The method of claim 1, wherein a compressive elastic modulus of the buffered spacer is 0.1 MPa to 10 MPa.

4. The method of claim 1, wherein the buffered spacer is a stacked structure comprising a non-elastic layer and an elastic layer, a stacked structure comprising an elastic layer provided between a plurality of non-elastic layers, or a stacked structure comprising a non-elastic layer provided between a plurality of elastic layers.

5. The method of claim 1, wherein a curing shrinkage rate of the curable composition is 15% or less.

6. The method of claim 1, wherein a thickness of the plastic substrate is 400 to 2000 μm, and a thickness deviation of the plastic substrate is within 1%.

7. The method of claim 1, wherein a surface of each of the flat plate lower substrate and the flat plate upper substrate is surface-treated with a release agent.

* * * * *